Patented July 7, 1925.

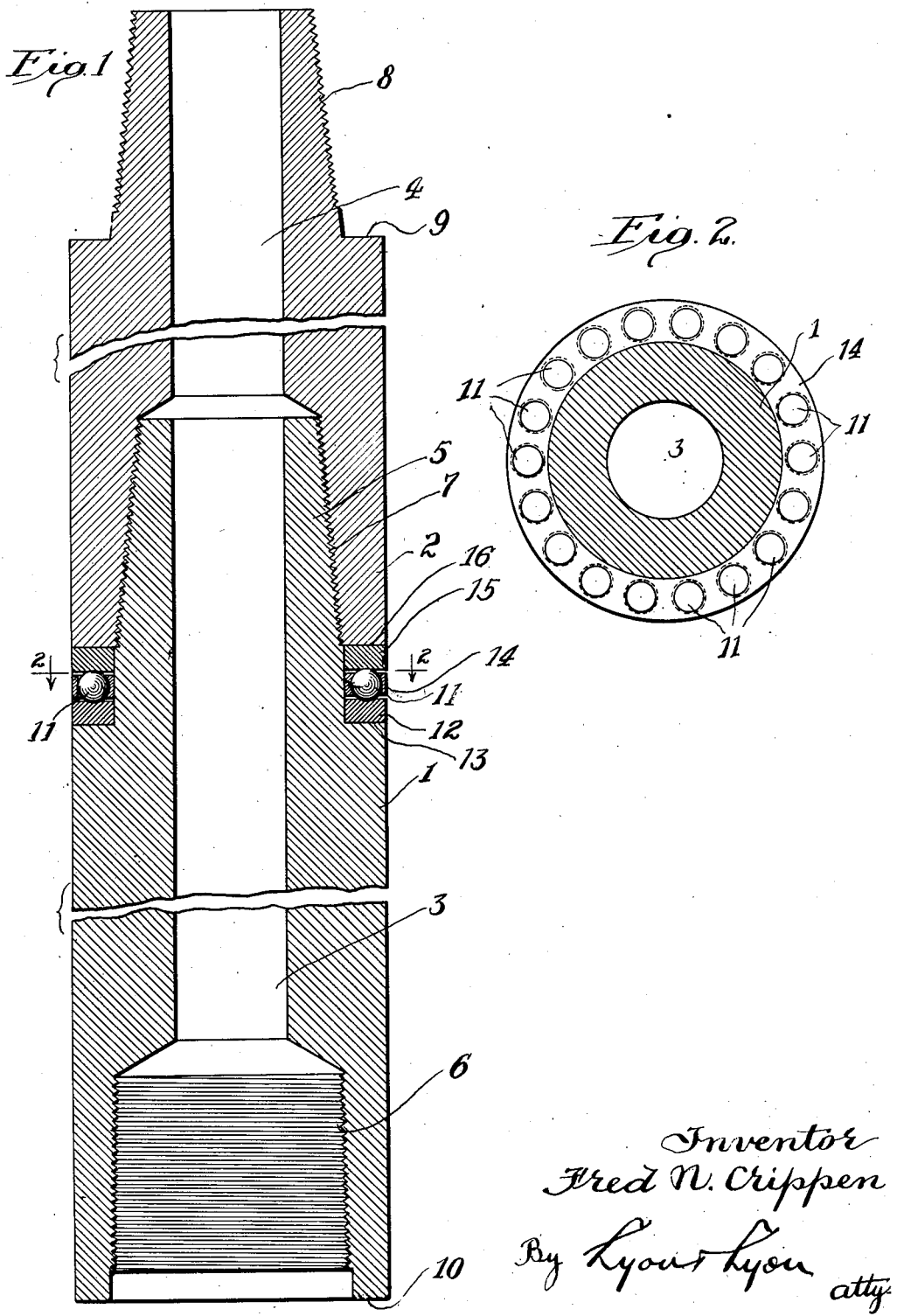

1,544,890

UNITED STATES PATENT OFFICE.

FRED NELSON CRIPPEN, OF PASADENA, CALIFORNIA, ASSIGNOR OF ONE-THIRD TO W. T. WOODS, OF LONG BEACH, CALIFORNIA.

SAFETY JOINT.

Application filed April 28, 1924. Serial No. 709,451.

*To all whom it may concern:*

Be it known that I, FRED N. CRIPPEN, a citizen of the United States, residing at Pasadena, in the county of Los Angeles and State of California, have invented a new and useful Safety Joint, of which the following is a specification.

This invention relates to a safety joint and refers particularly to a means for connecting together drill rod tubing casing or drilling devices employed in the construction of the operation of wells, such as oil wells.

With the customary form of threaded connection between the different connected parts of oil well drilling or operating apparatus, the connection frequently freezes or locks together in such a manner that the parts are extremely difficult to separate without damage thereto.

An object of the present invention is to provide a safety joint by which such drilling parts may be connected together without danger of the parts freezing together and thus provide a connection which may be easily broken when it is desired to separate such parts of the drilling apparatus.

Other objects and advantages of the invention will be apparent from the description of a preferred example of a safety joint embodying the present invention.

In the accompanying drawings, the preferred example of such a joint or connection is illustrated.

Figure 1 is an elevation in vertical section, and

Fig. 2 is a transverse section on the line 2—2 of Fig. 1.

In the drawings, 1 and 2, respectively, designate different members which are to be connected together, the members having bores or passage-ways 3 and 4, respectively, aligned and communicating one with the other.

In the example of the invention shown, both of the members are in form of tool joints, the member 1 having a tapered stem 5 at its upper end and a tapered socket 6 at its lower end, it being understood, however, that in place of a socket being provided at the end of the member 1 a bit or other drilling device or part may be used in connection therewith. The upper member 2 is provided with a tapered socket 7 at its lower end which is threaded to the stem 5 of the member 1 and terminates at its upper end in a threaded stem 8, although the upper end of the member might terminate in various other forms. Customarily, when connecting a tapered stem and socket a shoulder, such as indicated at 9 below the stem 8 of the member 2 is provided for engaging the lower end of the member providing the socket to be threaded to the stem. The stem 8, for example, when threaded up into the socket 6 would bring the shoulders 9 of the stem 8 and the end 10 of socket 6 into engagement one with the other to stop the tightening of the members at the proper connected position. Otherwise, a continual tightening of the members one to the other might cause a stripping or partial destruction or weakening of the threads on such members, and destroy or decrease the strength of the coupling.

When so connected, the shoulders 9 and 10 through corrosion or other causes, would frequently become frozen or locked together, rendering it extremely difficult to separate the members at the connection without damage thereto.

I overcome the disadvantage of such connections referred to by providing rollers between the members to be connected so that such rollers, while operating to stop the tightening of the members at the properly connected position, will prevent such members from being frozen or locked together.

The preferred form of such a means comprise a plurality of balls 11 supported upon an annular wear plate 12 engaging a shoulder 13 provided by the member 1 at the base of its threaded stem 5. A series of such balls may be held in position on the shoulder 13 by suitable means such as a receptacle 14. The receptacle is annular in shape and having series of openings for receiving the balls. The upper side of the balls engage an annular plate 15 similar to the plate 12, which plate 15 engages the lower end 16 of the socket 7 of the upper member 2, the balls and wear plates 15 and 12 being proportioned so that when the member 2 is tightened on the member 1, the tightening will be stopped by such balls and plates when the properly connected position between the two members has been arrived at. Thus, the members 1 and 2 are prevented from being tightened together beyond the point where the threads between the same will be destroyed while at the same time the balls 11 prevent freezing or locking of the members together, and permit the joint to be broken as desired.

While the embodiment of the invention herein described is well adapted to secure the objects of the present invention, it is understood that various modifications may be made in the form of the joint without departure from the spirit of the invention.

This invention is of the scope set forth in the appended claims.

I claim:

1. A safety joint of the class described, comprising two members, one having a tapered stem and the other a socket threaded to the stem, receptacle and balls disposed between the members, the balls engaging wear plates between the balls and members, such balls and wear plates being in position to stop the tightening of the members at the tightened position.

2. A safety joint of the class described, comprising two members threaded one to the other, a plurality of balls, an annular ball receptacle operative to retain the balls with part of the balls extending above the receptacle and part of the balls extending below the receptacle, said receptacle and balls being disposed between the members in position to stop the tightening of the members in the tightened position.

3. A safety joint of the class described, comprising two members one having a tapered stem, the other having a socket threaded to the stem, a plurality of balls disposed between the members in position to limit longitudinal movements of the members, and an annular receptacle for supporting the balls, said receptacle and balls being removable as a unit from said members.

Signed at Los Angeles, California, this 21st day of April, 1924.

FRED NELSON CRIPPEN.